Figure 1:
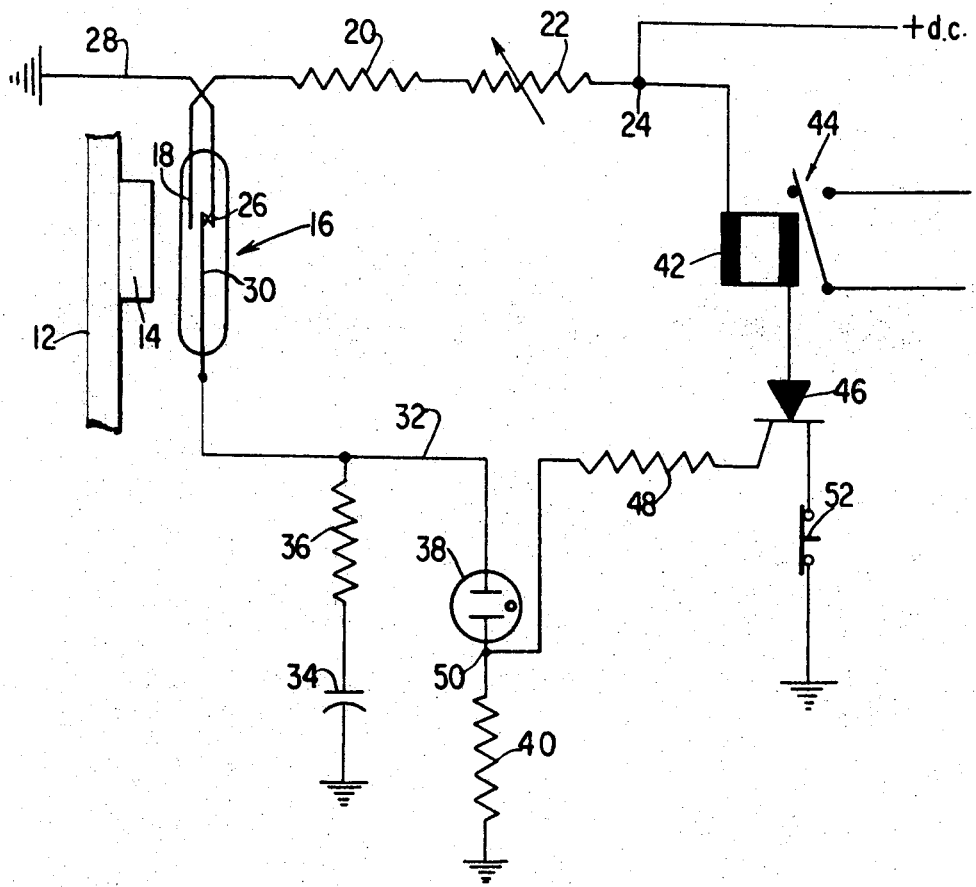

Dec. 17, 1968  J. N. JENSEN  3,417,289
SPEED SENSING SWITCH FOR ROTARY DRUMS AND THE LIKE
Filed Aug. 26, 1966

INVENTOR
JAMES N. JENSEN
BY
Smythe & Moore
ATTORNEYS

United States Patent Office 3,417,289
Patented Dec. 17, 1968

3,417,289
SPEED SENSING SWITCH FOR ROTARY
DRUMS AND THE LIKE
James N. Jensen, Davenport, Iowa, assignor to Ametek,
Inc., New York, N.Y., a corporation of Delaware
Filed Aug. 26, 1966, Ser. No. 575,318
9 Claims. (Cl. 317—5)

This invention relates to a speed responsive switch for rotary drums or other machines having a rotary or other moving part, and more particularly to a switch operable when a piece of machinery has slowed down to a predetermined speed or has come to a substantial standstill.

In commercial dryers, washing machines and other apparatus including a rotary drum or other piece of moving machinery, there is often a need for a switch to control an indicator or other circuit when the drum or other machine part has reached a predetermined slow speed or has come to a substantial standstill.

A principal object of the present invention is to provide a new and improved control circuit means for operating a switch or the like when a moving piece of machinery, such as a drum, slows down to a predetermined speed or comes to a substantial standstill.

A further object is to provide a speed sensing switch for rotary drums or other machinery which is controlled by a reed-type switch.

A still further object is to provide a relay circuit responsive to the speed of a piece of machinery which is operated entirely by electrical and magnetic means.

In one aspect of the invention, one or more spokes of a piece of rotating machinery, such as a sheave for driving a rotary drum or the like, are provided with a simple permanent type magnet, and a single-pole, double-throw reed-type switch is arranged on a stationary part of the machinery in a position to be swept by the permanent magnets. A charging circuit having an RC time constant is connected to a capacitor through the normally open contacts of the reed switch to provide for charging the capacitor when such contacts are closed by passage of a magnet. A circuit connetced through the normally closed contacts of the reed switch provides for discharging the capacitor between passages of a magnet. Connected across the capacitor is a second discharge circuit comprising a discharge element such as a neon bulb and a series resistor. The voltage across this resistor upon firing of the discharge element provides a switching or gating signal to a semiconductor switching means such as an SCR which is connected in series with the coil of a sensing relay or switch. The RC time constant of the charging circuit is such that the capacitor of the circuit is not charged enough during successive passages of a magnet to fire the above mentioned discharge element until the sheave or the like has slowed down to a predetermined speed or a substantial standstill. At such time, the discharge element fires, the SCR fires, and the control relay or switch is operated.

The above and other objects, advantages and features of the invention will become apparent from the following description and accompanying drawing which are merely exemplary.

Figure 2:
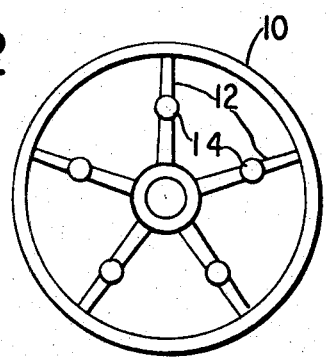

In the drawing:

FIG. 1 is a wiring diagram illustrative of the invention with certain of the rotating parts shown in fragmented section; and FIG. 2 is an elevational view of the rotary parts fragmentally shown in FIG. 1.

Referring to the drawing, there is shown a rotary member 10 having a plurality of spokes 12. The member 10 may be the driving sheave of a rotary drum or the like, or it may be any other piece of rotary machinery. Mounted on each of the spokes 12 is a permanent type magnet 14, and a single-pole, double-throw reed-type switch 16 is mounted on a stationary part of the machinery in a position to be swept by the magnets 14 upon rotation of the member 10. A normally open contact 18 of switch 16 is connected through a resistor 20 and a calibrating potentiometer 22 to the positive terminal 24 of a D.C. source of power. The normally closed contact 26 of switch 16 is connected to ground through a conductor 28. The pole contact 30 of the reed switch 16 is connected by conductor 32 to one side of a circuit comprising a capacitor 34 and series resistor 36, and to one side of a parallel discharge circuit comprising a neon bulb 38 and series resistor 40, the other sides of the circuits being connected to ground.

Also connected in series between the positive terminal 24 and ground is a control circuit comprising the coil 42 of a relay 44 and a SCR 46. The gate of the SCR is connected through a resistor 48 to a point 50 in the discharge circuit between the neon bulb 38 and the resistor 40. A normally closed contactor or switch 52 operated manually or by any desired means provides for opening the cathode circuit of the SCR 46 to cut off the SCR and restore relay 44 to its normal condition. It will be evident that relay 44 may be either normally open or normally closed and may control an indicator or any other desired circuit.

In operation, the circuit thus described works as follows. Since the charging circuit for the capacitor 34 is completed only when a spoke 12 and its associated magnet 14 pass the reed switch 16 to close the normally open contact 18, the charge received on capacitor 34 is dependent upon the time that contact 18 is closed and, therefore, upon the rotational speed of member 10 and spokes 12. This speed is normally such that the capacitor 34 does not charge sufficiently to operate the discharge circuit through the neon bulb 38. As a spoke 12 and its associated magnet 14 pass beyond the switch 16, the capacitor 34 discharges into ground through the then closed contact 26 of the switch. This operation continues until the rotational speed of member 10 becomes so slow, for example, almost at a standstill, that the capacitor 34 accumulates sufficient charge during the time that a magnet 14 remains opposite the reed switch 16 so as to cause discharge of the neon bulb 38. Such discharge causes a voltage pulse at point 50 which gates the SCR 46 through resistor 48 into a conductive condition. This in turn operates the control or speed sensing relay 44, the constant of the relay thus becoming a speed responsive or sensing switch. The time constant for the charging of capacitor 34, and hence the minimum speed of member 10 which will operate the control circuit, is determined by the resistance of resistors 20, 22 and 36. This time can be controlled for the desired maximum speed by the variable potentiometer 22. Resistor 36 protects the reed switch 16 and neon bulb 38 from excessive currents, and the voltage drop across resistor 40 upon discharge of bulb 38 provides the switching signal for the gate of SCR 46. Resistance 48 protects the gate of the SCR from excessive voltage and current upon firing or discharge of tube 38. Contactor or switch 52, as above explained, provides for restoring the circuit to its normal condition.

While an exemplary embodiment of the invention has been illustrated and described, it will be apparent that various modifications, alterations and changes may be made without departing from the spirit of the invention, and it is intended to be limited only by the scope of the appended claims. It will be evident, for example, that only one permanent magnet positioned on one spoke may be used if a sensing signal for a predetermined slow speed rather than substantial standstill is desired, and that the magnets may be positioned on any desired part of a sheave or other rotary member. It will also be apparent that one or more of the magnets 14 may be carried by any moving piece of machinery whether rotary or not.

What is claimed is:

1. In a speed sensing device for a machine having a moving member, the combination of a magnetic means carried by said moving member for movement therewith, a reed-type switch having a pair of normally open contacts mounted on a stationary part of said machine in a position to be swept by said magnetic means, a capacitor, charging circuit means connected through the normally open contacts of said reed-type switch for charging said capacitor at a predetermined time constant upon closing of said contacts, circuit means for discharging said capacitor when said contacts are open, a second discharge circuit means including a discharge element adapted to fire upon said capacitor reaching a predetermined charge connected across said capacitor, a control circuit means including a relay means and a semiconductor switching means connected in series, and circuit means for applying a switching signal to said semiconductor switching means upon operation of said discharge element.

2. The combination as set forth in claim 1 in which said reed-type switch includes both normally open and normally closed contacts, and said first mentioned circuit means for discharging said capacitor is connected through said normally closed contacts of said reed-type switch.

3. The combination as set forth in claim 2 in which a resistor common to both said discharge circuit means provides for protecting said reed-type switch and said discharge element from excessive currents.

4. The combination as set forth in claim 1 in which said charging circuit means includes a variable resistance means for varying the time constant for charging said capacitor thereby to adjust the speed at which said magnetic means operates said control circuit means.

5. The combination as set forth in claim 1 in which said magnetic means comprises a permanent magnet.

6. The combination as set forth in claim 1 in which said magnetic means comprises a plurality of spaced permanent magnets.

7. The combination as set forth in claim 1 in which said discharge element comprises a neon type bulb.

8. The combination as set forth in claim 1 in which said semiconductor switching means comprises a silicon controlled rectifier.

9. The combination as set forth in claim 8 in which said second discharge circuit means includes a series resistor for applying a switching signal to the gate of said silicon controlled rectifier through said last-named switching circuit means.

References Cited

UNITED STATES PATENTS

| 3,284,668 | 11/1966 | Heaslip | 317—5 |
| 3,289,041 | 11/1966 | Sherman | 317—5 |
| 3,300,700 | 1/1967 | Wigington | 318—246 |
| 3,351,811 | 11/1967 | Buckley et al. | 317—5 |

LEE T. HIX, *Primary Examiner.*

J. A. SILVERMAN, *Assistant Examiner*

U.S. Cl. X.R.

317—148.5, 149